United States Patent
McCrory et al.

Patent Number: 5,453,191
Date of Patent: Sep. 26, 1995

[54] DEVICE FOR CONTAINING AND ABSORBING OIL SPILLS ON WATER

[76] Inventors: Brett D. McCrory, 2105 Colony Dr.; Phillip A. McCrory, 2207 Colony Dr., both of Huntsville, Ala. 35802

[21] Appl. No.: 139,539

[22] Filed: Oct. 20, 1993

[51] Int. Cl.⁶ .................................................. E02B 15/04
[52] U.S. Cl. ........................ 210/242.4; 210/693; 210/924
[58] Field of Search ................................ 210/242.4, 671, 210/691, 693, 924

[56] References Cited

U.S. PATENT DOCUMENTS

| | | | |
|---|---|---|---|
| 3,539,013 | 11/1970 | Smith | 210/242.4 |
| 3,617,566 | 11/1971 | Oshima | 210/242.4 |
| 3,667,235 | 6/1972 | Preus et al. | 210/242.4 |
| 3,679,058 | 7/1972 | Smith | 210/693 |
| 3,702,657 | 11/1972 | Cunningham et al. | 210/924 |
| 3,739,913 | 6/1973 | Bogosian | 210/242.4 |
| 4,013,585 | 3/1977 | Terajima et al. | 210/693 |
| 4,072,794 | 2/1978 | Tomita et al. | 210/679 |
| 4,102,789 | 7/1978 | Young | 210/242.4 |
| 4,366,067 | 12/1982 | Golding et al. | 210/671 |
| 4,919,820 | 4/1990 | Lafay et al. | 210/242.4 |
| 5,102,261 | 4/1992 | Gunderson, III | 405/70 |
| 5,165,821 | 11/1992 | Fischer et al. | 210/924 |

*Primary Examiner*—Christopher Upton
*Attorney, Agent, or Firm*—B. Craig Killough

[57] ABSTRACT

Human hair is present within a porous casing. Oil floating on water enters the porous casing whereupon the oil is absorbed by the human hair. Flotational material is mixed with the human hair or attached to the casing to cause the device to float.

12 Claims, 2 Drawing Sheets

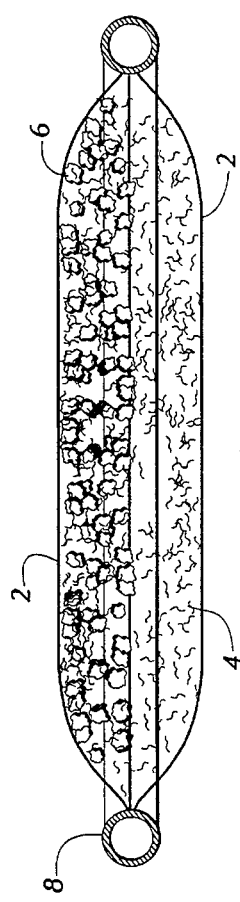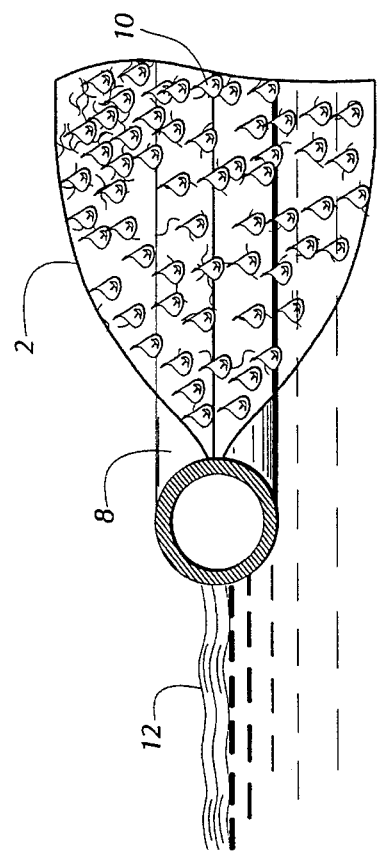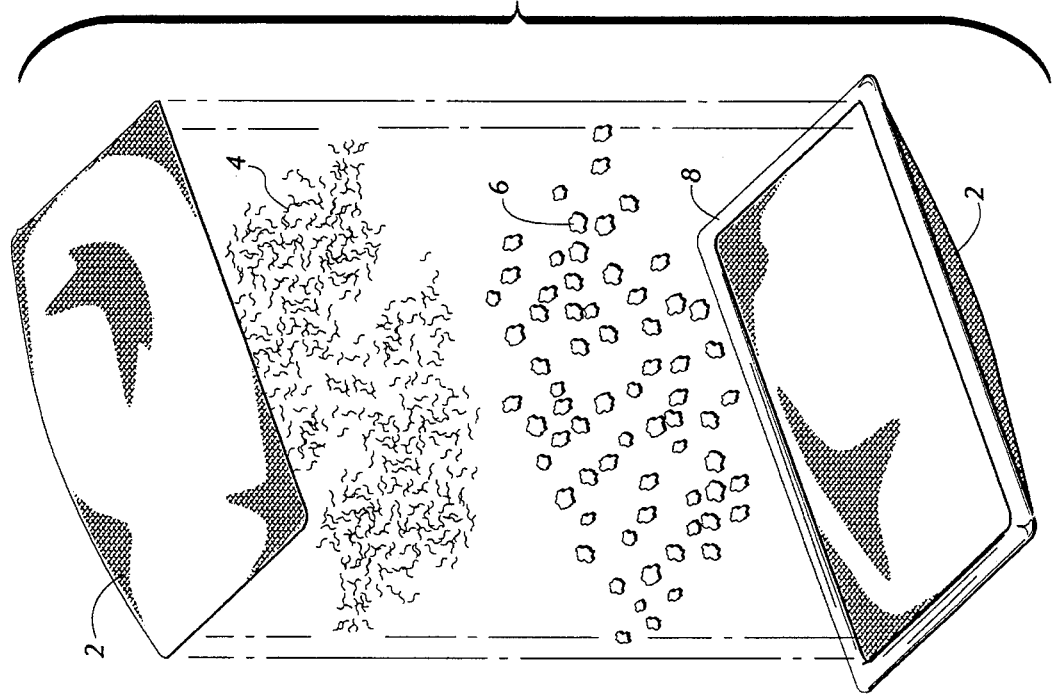

DEVICE FOR CONTAINING AND ABSORBING OIL SPILLS ON WATER

BACKGROUND AND SUMMARY OF THE INVENTION

This invention relates to a device for absorbing oil or liquid materials, and is specifically directed to a device for containing and absorbing oil spills on water.

Oil and other liquids having a specific gravity which is less than water are frequently transported by boats and ships. Oil and other potentially hazardous liquids are transported across or through water by pipelines or similar conduits. Such liquid materials are loaded onto ships by means of pipelines, requiring a connection of a pipeline to the ship.

Spills of oil and other liquid materials which float on water are common. Shipwrecks or hazards at sea or in waterways can cause oil or other materials to be spilled or otherwise accidentally discharged into waterways. Even vessels which are carrying oil as cargo are powered by diesel fuels or other petroleum fuels, and fuels and engine lubricants may be accidentally discharged into water.

Pipelines and other conduits which cross waterways are subject to breakage, subjecting the waterway to pollution from discharge of the oil or other material into the waterway. Frequently, oil or other liquid materials are loaded onto ships as cargo by means of pipelines and similar conduits. These pipelines may break or rupture due to accidents or maintenance failures.

All of the examples cited above subject waterways to pollution from oil and other liquid materials having a specific gravity which is less than water. Oil and other materials so discharged float on the water.

Various devices are known in the art which surround and absorb or otherwise capture oil or other floating liquid materials. Some of these devices disclose fabric or netting containing filaments or other oil absorbing material. These devices typically float upon the water, and absorb water as the device contacts the oil spill. The device may be elongated so as to be formed around the oil and contain the oil spill. The prior art discloses such varied absorption materials as hay, straw, bark, sawdust, urethane foam, nylon, rayon, polyester, glass, wool, and cotton.

SUMMARY OF THE PRESENT INVENTION

The present invention comprises a casing which is porous to allow water and oil to pass through the casing. Human hair is contained within the casing, and absorbs oil as the oil enters the device through the casing. A flotational material is combined with the human hair so as to cause the device to float as the device absorbs oil and water. Alternatively, flotational means may be connected to the device.

Human hair is superior in absorbing oil to those materials disclosed by the prior art. Five (5) pounds of human hair, occupying approximately three cubic feet, will absorb about one (1) gallon of oil.

DESCRIPTION OF THE DRAWINGS

FIG. 2 is an exploded view of the device.

FIG. 3 is a sectioned view taken essentially along line 3—3 of FIG. 1.

FIG. 4 is a partial view of the device.

DETAILED DESCRIPTION OF THE PREFERRED EMBODIMENT

Figure 1:
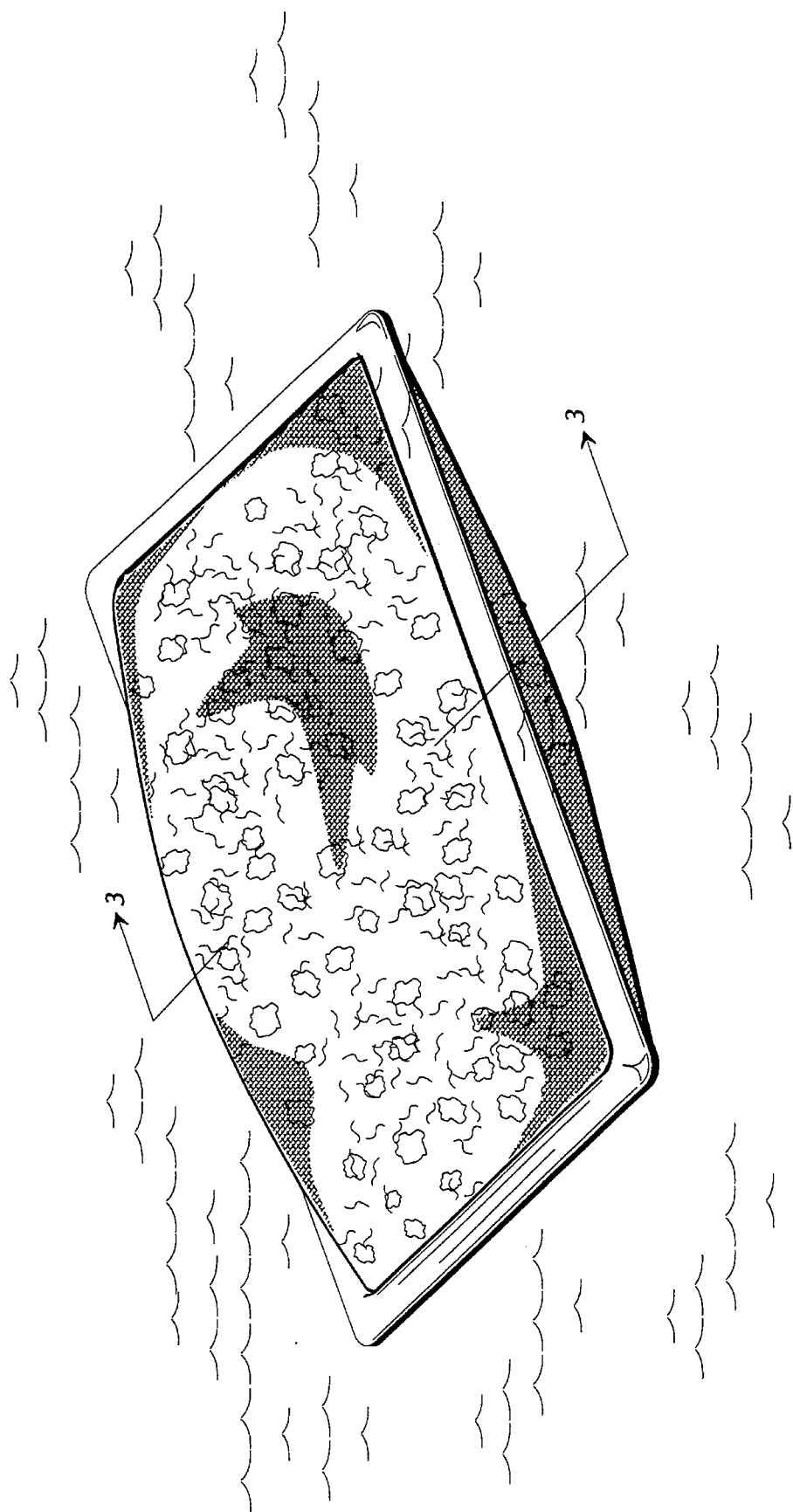
FIG. 1 is a perspective view of an embodiment of the device floating on water.

Referring now to the drawings, FIG. 2 demonstrates the casing 2 for the device, human hair 4 and flotation material 6. The flotation material and the human hair may be mixed and contained within the casing. One example of such a mixture is shown in FIG. 3.

The casing is a porous material. A fabric material such as nylon may be used for casing. The casing has openings which are of sufficient size to allow water and oil to freely pass through the casing. The casing must be sufficient to retain the human hair and flotation material within the casing. The casing 2 is shown as being in two parts in FIG. 2 for demonstration purposes only. The casing could be a seamless elongated tube, for example, or the casing could comprise multiple parts which are connected such as by seaming. The casing could be made of a material which will retain the human hair 4 and the flotation material 6, if the flotation material is mixed with the human hair, and through which oil and water may pass so that the human hair absorbs the oil.

A low density material may be mixed with the human hair to provide flotation. This low density material may be styrofoam. The flotation material should be a material which will not lose its flotational characteristics when emersed in water, and could be any known material of these qualities.

A flotational means could be attached to the device rather than combined or mixed with the human hair. However, the casing and the human hair must be in constant contact with the surface of the water, and the flotational means must be capable of holding the casing in a proper position to maximize contact of the human hair with the surface of the water on which the oil is floating.

The device may incorporate a frame to retain the shape of the casing. The frame should contact the casing at sufficient points to retain the shape of the casing. An example of such a frame is shown in the drawing figures. The frame 8 shown is rectangular, and contacts the casing on all four sides to maintain the shape of the casing. The frame could be any substantially rigid material. The frame could be metal, plastic, or similar material. A frame made of relatively low density material may improve the flotational characteristic of the device.

It is not necessary that a frame be used with the device. If the device is to be formed in an elongate manner, or in chains of the device, it may be desirable to use the device without a frame so that the device may be formed to the desired shape in use. The device in an elongate form, for example, may be formed while in use so as to surround, contain, and subsequently reduce the area of the oil spill.

Human hair is contained within the casing. Human hair absorbs oil as it enters the casing. Human hair is efficient at absorbing oil, and is particularly efficient when present within the casing at the desired density. In the preferred embodiment, the density of the human hair is 1.67 pounds per cubic foot. A range of 1.33 to 2.00 pounds of human hair per cubic foot will yield acceptable results. This preferred density does not include the volume taken up by the flotational material, if a flotational material is combined with the human hair. The human hair will absorb approximately one (1) gallon of oil per five (5) pounds of human hair when used in the preferred density.

In use, the device floats on the surface of the water. As shown in FIG. 4, in the preferred embodiment, approximately half of the height of the device is above the water line, and approximately half of the height of the device is below the water line. In this way, the device which is floating on the surface of the water will achieve maximum contact with the oil 12. Oil and water pass through the casing, and into the interior of the casing to contact the hair. Human hair has a natural oil absorbing tendency, and accordingly, absorbs the oil 10. A certain amount of water will be absorbed as well, although the tendency of the hair is to absorb oil in preference to water.

Once the device becomes saturated, the oil, as well as any water present in the device, may be removed by wringing the device by manual or mechanical means. After the oil and water are extracted, the device may be reused to absorb more oil.

Human hair as used in the device is readily available. The human hair may be obtained from the sweepings of barber shops, hair salons and the like. It is not necessary that human hair of any particular length or configuration be used in the device. The device has been demonstrated successfully using ordinary sweepings from a hair salon. Unlike the devices of the prior art, the absorbing agent has few, if any, competing commercial uses, since sweepings from beauty salons and barber shops are usually discarded. The use of human hair has no adverse environmental impacts or side effects. The cost and utility are, therefore, superior to absorbing agents disclosed by the prior art.

What is claimed is:

1. A device for containing and absorbing oil spills on water, comprising:
    a. a porous casing allowing the passage of water and oil there through;
    b. human hair which is contained within said casing; and
    c. a flotational material which causes said device to float on water.

2. A device for containing and absorbing oil spills on water, as described in claim 1, wherein said flotational material is combined with said human hair and is contained within said casing and is present within said casing in a sufficient quantity to cause said device to float on water.

3. A device for containing and absorbing oil spills on water as described in claim 2, further comprising a rigid support structure which surrounds said casing and contacts said casing about all sides thereof to cause said casing to retain its shape.

4. A device for containing and absorbing oil spills on water as in claim 3, wherein said human hair is present in said casing at a density of 1.33 to 2.00 pounds per cubic foot.

5. A device for containing and absorbing oil spills on water as described in claim 2, wherein said casing in elongated and flexible and wherein said casing is formed in use to surround and contain an oil spill.

6. A device for containing and absorbing oil spills on water as in claim 5, wherein said human hair is present in said casing at a density of 1.33 to 2.00 pounds per cubic foot.

7. A device for containing and absorbing oil spills on water as in claim 2, wherein said human hair is present in said casing at a density of 1.33 to 2.00 pounds per cubic foot.

8. A device for containing and absorbing oil spills on water as described in claim 1, further comprising a rigid support structure which surrounds said casing and contacts said casing about all sides thereof to cause said casing to retain its shape.

9. A device for containing and absorbing oil spills on water as in claim 8, wherein said human hair is present in said casing at a density of 1.33 to 2.00 pounds per cubic foot.

10. A device for containing and absorbing oil spills on water as described in claim 1, wherein said casing in elongated and flexible and wherein said casing is formed in use to surround and contain an oil spill.

11. A device for containing and absorbing oil spills on water as in claim 10, wherein said human hair is present in said casing at a density of 1.33 to 2.00 pounds per cubic foot.

12. A device for containing and absorbing oil spills on water as in claim 1, wherein said human hair is present in said casing at a density of 1.33 to 2.00 pounds per cubic foot.

* * * * *

UNITED STATES PATENT AND TRADEMARK OFFICE
CERTIFICATE OF CORRECTION

PATENT NO. : 5,453,191
DATED : September 26, 1995
INVENTOR(S) : McCrory, et al.

It is certified that error appears in the above-indentified patent and that said Letters Patent is hereby corrected as shown below:

On title page, item [76] should read as follows:

-- Inventor(s): Phillips A. McCrory, 2207 Colony Drive, Huntsville, Alabama --

Signed and Sealed this

Fifth Day of December, 1995

Attest:

BRUCE LEHMAN

*Attesting Officer*  Commissioner of Patents and Trademarks